(12) United States Patent
Conrad et al.

(10) Patent No.: US 11,009,587 B2
(45) Date of Patent: May 18, 2021

(54) PORTABLE APPARATUS, SYSTEM, AND METHOD FOR CALIBRATING A VEHICULAR ELECTROMAGNETIC SENSOR

(71) Applicants: Bosch Automotive Service Solutions Inc., Warren, MI (US); Robert Bosch GmbH, Stuttgart (DE)

(72) Inventors: Michael Conrad, Davison, MI (US); Robert Pendygraft, Howell, MI (US); Andrew Prusinowski, Royal Oak, MI (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 286 days.

(21) Appl. No.: 15/982,640

(22) Filed: May 17, 2018

(65) Prior Publication Data

US 2019/0004147 A1    Jan. 3, 2019

Related U.S. Application Data

(60) Provisional application No. 62/527,426, filed on Jun. 30, 2017.

(51) Int. Cl.
*G01S 7/40* (2006.01)
*G01S 13/931* (2020.01)
(Continued)

(52) U.S. Cl.
CPC .......... *G01S 7/4004* (2013.01); *G01S 7/4026* (2013.01); *G01S 13/931* (2013.01); *G01S 7/497* (2013.01); *G01S 17/88* (2013.01); *G01S 2007/4086* (2013.01); *G01S 2013/9323* (2020.01); *G01S 2013/93271* (2020.01)

(58) Field of Classification Search
CPC ....... G01S 7/4004; G01S 7/4026; G01S 7/497
See application file for complete search history.

(56) References Cited

U.S. PATENT DOCUMENTS

| | | | |
|---|---|---|---|
| 5,438,939 A | * | 8/1995 | Clarke ..................... A47B 9/10 108/147 |
| 6,418,775 B1 | | 7/2002 | Sager et al. |

(Continued)

FOREIGN PATENT DOCUMENTS

| | | |
|---|---|---|
| CA | 2838992 | 12/2012 |
| WO | 2013004327 | 1/2013 |
| WO | 2016096199 | 6/2016 |

OTHER PUBLICATIONS

"Standard Procedure—Adaptive Speed Control Sensor Alignment", 08-Electrical8E—Electronic Control Modules/MODULE, Adaptive Cruise Control/Module Programming.

(Continued)

*Primary Examiner* — Marcus E Windrich
(74) *Attorney, Agent, or Firm* — David Kovacek; Maginot, Moore & Beck LLP (57) ABSTRACT

An apparatus, system, and method for calibrating an electromagnetic sensor of a vehicle. Calibration is performed by positioning a calibration apparatus at known positions relative to the electromagnetic sensor of the vehicle, and taking measurements with respect to each known position. The calibration apparatus disclosed herein further comprises adjustable components.

17 Claims, 6 Drawing Sheets

(51) Int. Cl.
  *G01S 7/497* (2006.01)
  *G01S 17/88* (2006.01)

(56) References Cited

U.S. PATENT DOCUMENTS

| | | | | |
|---|---|---|---|---|
| 6,822,222 | B2 * | 11/2004 | Hayek | H01J 49/0036 250/281 |
| 6,823,601 | B2 * | 11/2004 | Murray | G01S 7/4972 33/288 |
| 7,424,387 | B1 * | 9/2008 | Gill | G01B 11/2755 702/150 |
| 7,501,980 | B2 | 3/2009 | Focke et al. | |
| 7,663,502 | B2 | 2/2010 | Breed | |
| 8,020,307 | B2 * | 9/2011 | Schwindt | G01S 7/4972 33/288 |
| 8,833,815 | B2 * | 9/2014 | Aleem | B60R 19/02 293/102 |
| 10,288,721 | B2 * | 5/2019 | Paap | G01B 11/272 |
| 2001/0008446 | A1 * | 7/2001 | Hopfenmuller | G01M 11/067 356/139.09 |
| 2006/0164295 | A1 * | 7/2006 | Focke | G01S 13/867 342/174 |
| 2015/0204806 | A1 * | 7/2015 | Mazor | G01N 23/223 378/46 |
| 2017/0003141 | A1 * | 1/2017 | Voeller | G01C 25/00 |

OTHER PUBLICATIONS

DACT 2010, Radar & Camera calibration Tool, 900000482, Maserati.
RSCD 2100, Original Instructions, Beissbarth.
"VAS 6430, suitable for all manufacturers, mobile or staionary", Testing and Adjustment of Driver Assistance Systems, Volkswagon.

* cited by examiner

PORTABLE APPARATUS, SYSTEM, AND METHOD FOR CALIBRATING A VEHICULAR ELECTROMAGNETIC SENSOR

TECHNICAL FIELD

This disclosure relates to the calibration of electromagnetic sensors, and in particular relates to a portable apparatus, system, and method of calibrating an electromagnetic sensor of a vehicle.

BACKGROUND

Onboard sensors in a vehicle are useful safety devices that are increasingly common. Onboard sensors can provide vehicle operators and passengers with useful information about the surrounding environment, or may provide data to other vehicular systems to enhance the performance of those systems. Electromagnetic sensors make use of reflections of waves in the electromagnetic spectrum to measure distances, positions, and speeds of objects in the vehicle's operating environment.

Sensors require calibration to function properly and to assure accurate measurements. Calibration of sensors on vehicles are typically performed using a diagnostic tool connected to the sensor in conjunction with a specialized calibration tool. Existing calibration tools often take the form of large apparatuses that are immobile, difficult to position properly in relation to the vehicle, difficult to adjust during the calibration process, made using fragile components, and costly. It is therefore desirable for a calibration apparatus that is more compact, easier to position in relation to the vehicle, easier to adjust during the calibration process, composed of more robust materials, and less costly.

SUMMARY

An embodiment of the disclosed invention, is directed to an electromagnetic sensor calibration apparatus to calibrate an electromagnetic sensor of a vehicle in conjunction with a diagnostic tool. The apparatus comprises a primary alignment structure having a reflective-surface plate operable to reflect electromagnetic waves emitted by the electromagnetic sensor. The apparatus further comprises a tracking-alignment reference structure that is used to determine the proper placement of the primary alignment structure, and to align the primary alignment structure such that the reflective-surface plate is perpendicular to the direction of the vehicle's wheel-tracking. The apparatus further comprises a verticality instrument to determine the proper upright angle of the reflective-surface plate. The apparatus further comprises a linear-distance instrument to properly position and align the primary alignment structure and the tracking-alignment reference structure.

In another aspect of the invention, the reflective-surface plate of the primary alignment structure may be adjusted with respect its vertical tilt. In a preferred embodiment, the reflective-surface plate tilt adjustment may be accomplished using height-adjustable feet affixed to the primary alignment structure to adjust the tile of the entire primary alignment structure, using an angle-adjustable connective joint to position the portion of the primary alignment structure substantially supporting the reflective-surface plate, and using a quick-adjustment pivot mechanism to quickly adjust the alignment of the reflective-surface plate in relation to the supporting portion of the primary alignment structure.

In another aspect of the invention, the primary alignment structure is substantially foldable and the tracking-alignment reference structure may be removeably attached to the primary alignment structure such that the apparatus is more compact for travel or storage.

In another aspect of the invention, the apparatus is used for performing a method of calibrating an electromagnetic sensor of a vehicle.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice a preferred embodiment.

Figure 1A:
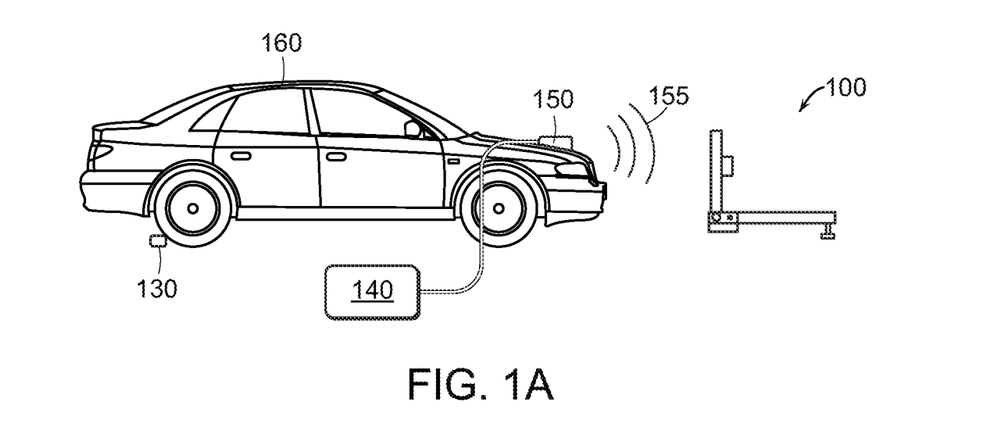
FIG. 1a is a diagrammatic side view of an electromagnetic sensor calibration system as used with a vehicle.
Figure 1B:
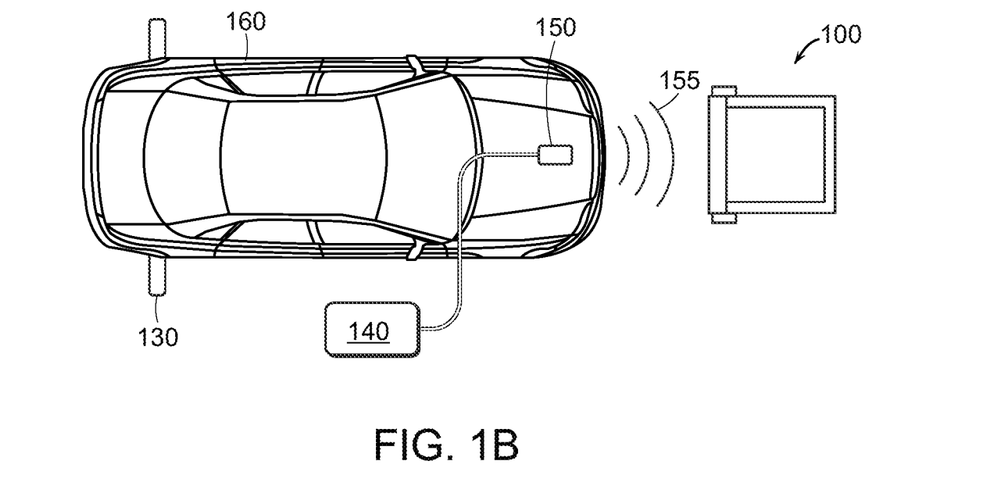
FIG. 1b is the system of FIG. 1a, shown from a top-down view.

FIGS. 1a-1b shows an electromagnetic sensor calibration system during calibration of an onboard electromagnetic sensor 150 of a vehicle 160. The system includes a primary alignment structure 100, a tracking-alignment reference structure 130, and a diagnostic tool 140. Diagnostic tool 140 is configured to provide instructions to the electromagnetic sensor 150 during the calibration, and is further configured to receive data generated by the electromagnetic sensor 150 during the calibration. Diagnostic tool 140 may be implemented using a software operated by a processor, a specialized electronic device, a specialized processor device, firmware operated by a processor, or any combination thereof. In one embodiment, diagnostic tool 140 is implemented using a specialized diagnostic tool having a vehicle communication interface. In an embodiment, the vehicle communication interface is configured to operate using, an onboard diagnostic (e.g., OBD-II) port (not shown). During calibration, electromagnetic sensor 150 generates emitted electromagnetic waves 155.

In the illustrated embodiment electromagnetic sensor 150 is a forward-facing sensor of the vehicle 160, but one of ordinary skill will recognize alternative configurations. In one embodiment, electromagnetic sensor 150 is configured to emit and detect radar signals, but other forms of electromagnetic waves may be used including infrared (1R) signals, ultraviolet (UV) signals, visible-light spectrum signals, or other electromagnetic waves known within the art.

Figure 2:
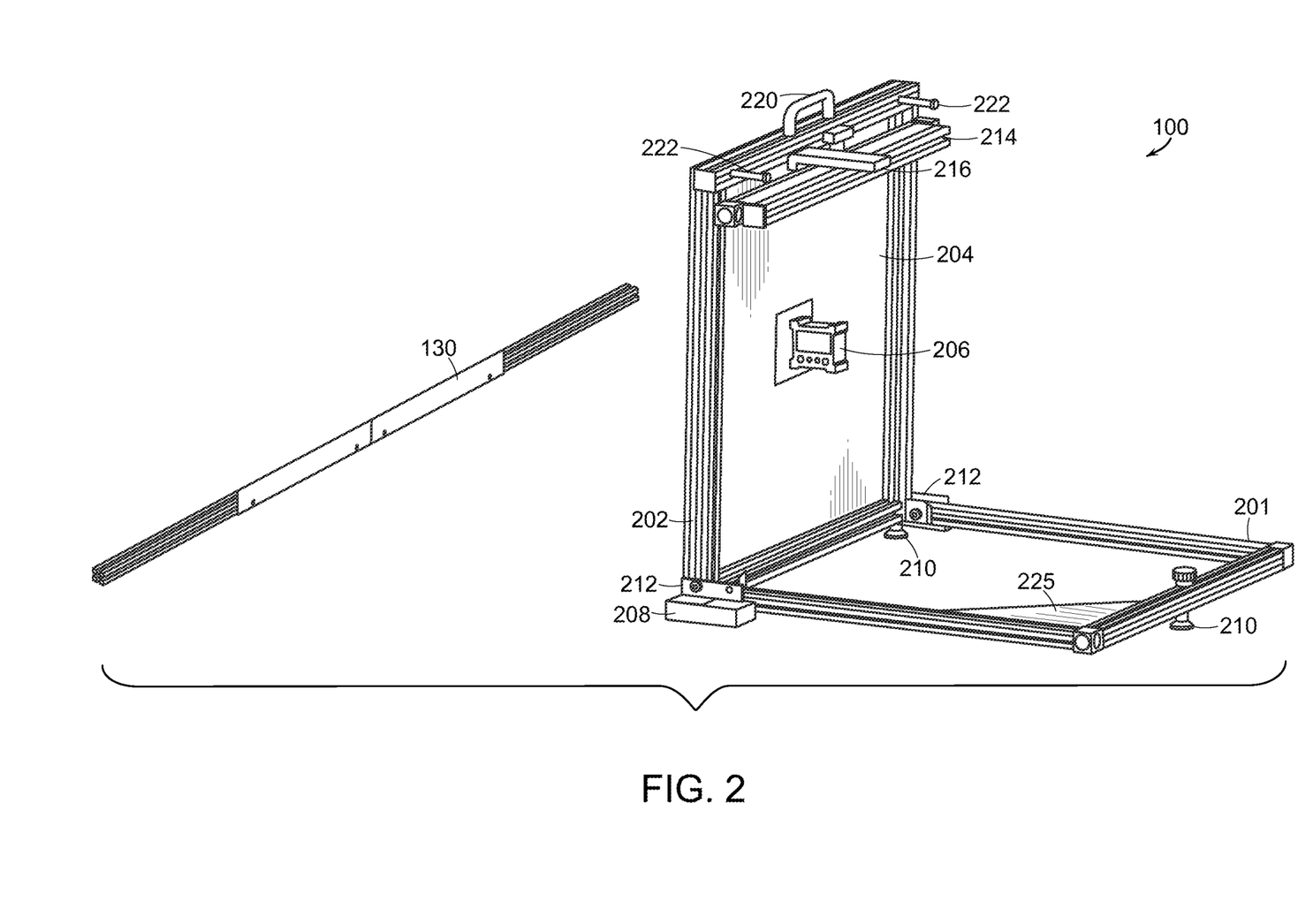
FIG. 2 is a rear isometric view of a vehicular electromagnetic sensor calibration apparatus.

FIG. 2 provides a closer view of the primary alignment structure 100 and the tracking-alignment reference structure 130. Primary alignment structure 100 comprises a first sub-structure 201 having a number of foot structures 210 providing a substantially stable horizontal base for primary alignment structure 100. Primary structure 100 further has a second sub-structure 202 providing an upright support for a reflective-surface plate 204. Reflective-surface plate 204 is coupled to second sub-structure 202. In the shown embodiment, the reflective-surface plate 204 is coupled to second sub-structure 202 using an angle-adjustable coupling mechanism 222. The first sub-structure 201 and the second sub-structure 202 are coupled using a connective joint 212. A verticality instrument 206, shown here attached to the reflective-surface plate 204, is used to determine the verticality of reflective-surface plate 204. A linear-distance instrument 208, shown here coupled to first sub-structure 201, provides measurements to aid in proper positioning of the primary alignment structure 100 in relation to tracking-alignment reference structure 130 for calibration. In one embodiment, second sub-structure 202 comprises a crossbar 214 disposed between two members of second sub-structure 202. Crossbar 214 is operably coupled to a quick-adjustment pivot mechanism 216. In this embodiment, the primary alignment structure 100 also comprises a carrying handle 220 and a storage enclosure 225 attached thereto.

Reflective-surface plate 204 provides a surface upon which emitted electromagnetic waves 155 will reflect back toward electromagnetic sensor 150 during calibration (see FIG. 1). Reflective-surface plate 204 is sufficiently tall when placed upright to effectively reflect the emissions of the electromagnetic sensor 150 as positioned onboard vehicle 160 (also in FIG. 1). In one embodiment, reflective-surface plate 204 shall have dimensions of at least 20 inches by 20 inches, but one of ordinary skill will recognize other embodiments are necessary to accommodate other configurations of vehicle 160. In order to achieve proper reflection of the emitted electromagnetic waves 155 during calibration, reflective-surface plate 204 has a surface flatness of at least 0.12 mm as defined by general geometric dimensioning and tolerancing (GD&T) practices. Contemplated materials for reflective-surface plate include glass (including mirrored glass) and aluminum, though one of ordinary skill will recognize other materials having sufficient surface flatness. In one embodiment, reflective-surface plate 204 is made from aluminum for greater durability.

During calibration, the proper positioning of the reflective-surface plate 204 relative to electromagnetic sensor 150 is desired to ensure accurate calibration measurements. Reflective-surface plate 204 is positioned at particular degrees of verticality, or particular degrees of an upright angle with respect to a true horizontal plane. To achieve particular verticality, verticality instrument 206 provides verticality measurements with respect to reflective-surface plate 204. In one embodiment, verticality measurements are accurate to within 0.05 degrees. In one embodiment, verticality instrument 206 is attached to reflective-surface plate 204, but other configurations known to one of ordinary skill are additionally contemplated. In one embodiment, verticality instrument 206 is a digital level tool, but alternative contemplated embodiments include a bubble-level tool, an electronic level, a laser line level, or other equivalents known to one of ordinary skill in the art. Reflective-surface plate 204 is additionally positioned at a distance from the electromagnetic sensor 150. To achieve proper distance placement, linear-distance instrument 208 provides distance measurements with respect to reflective-surface plate 204. In the shown embodiment, linear-distance instrument 208 is coupled to primary alignment structure 100 such that it is aligned to measure the distance from reflective-surface plate 204, but other configurations known to one of ordinary skill are additionally contemplated. In one embodiment, linear-distance instrument 208 is an optical rangefinder, but alternative contemplated embodiments include a sonic rangefinder, a tape measure, a fixed-length cable, a fixed-length rigid measurement tool, or other equivalents known to one of ordinary skill in the art.

In one embodiment, the distance between reflective-surface plate 204 and electromagnetic sensor 150 during calibration is 1.0-1.5 meters. Because the electromagnetic sensor 150 may be disposed within the vehicle 160 in a manner preventing accurate direct linear-distance measurement, primary alignment structure 100 may be positioned at a known distance and angle with respect to tracking-alignment reference structure 130. Tracking-alignment reference structure 130 is placed at a known external position with respect to the vehicle 160, the known external position being at a known distance from electromagnetic sensor 150 and determined by the specifications of vehicle 160. In one embodiment, tracking-alignment reference structure 130 is placed in a position perpendicular to the wheel-tracking direction of the vehicle 160 near the rearmost wheels of the vehicle, though other positions are contemplated. The tracking-alignment reference structure 130 may be placed on the ground behind the vehicle 160 and slid forward chucking opposing ends of the tracking-alignment reference structure 130 between the ground and the rear side of the rear tires of the vehicle 160. With the tracking-alignment reference structure 130 in this position, the primary alignment structure 100 may be positioned such that the reflective-surface plate 204 is at a known distance and parallel angle to the tracking-alignment reference structure 130. In one embodiment, a pair of linear-distance instruments 208 disposed on either side of primary alignment structure 201 are used to determine proper positioning in relation to tracking-alignment reference structure 130, though alternative equivalents will be readily recognized by one of ordinary skill.

Advantageously, if the tracking-alignment reference structure 130 is aligned to the wheel-tracking direction of the vehicle 160, the electromagnetic sensor 150 may be calibrated with reflective-surface plate 204 being perpendicular to the actual direction of forward motion of vehicle 160 when it is driven. Thus, an accuracy of an electromagnetic sensor 150 used for the detection of oncoming objects while a vehicle 160 is being driven is preserved during calibration, even if there is misalignment between the chassis of the vehicle 160 and the direction of forward motion.

Figure 3:
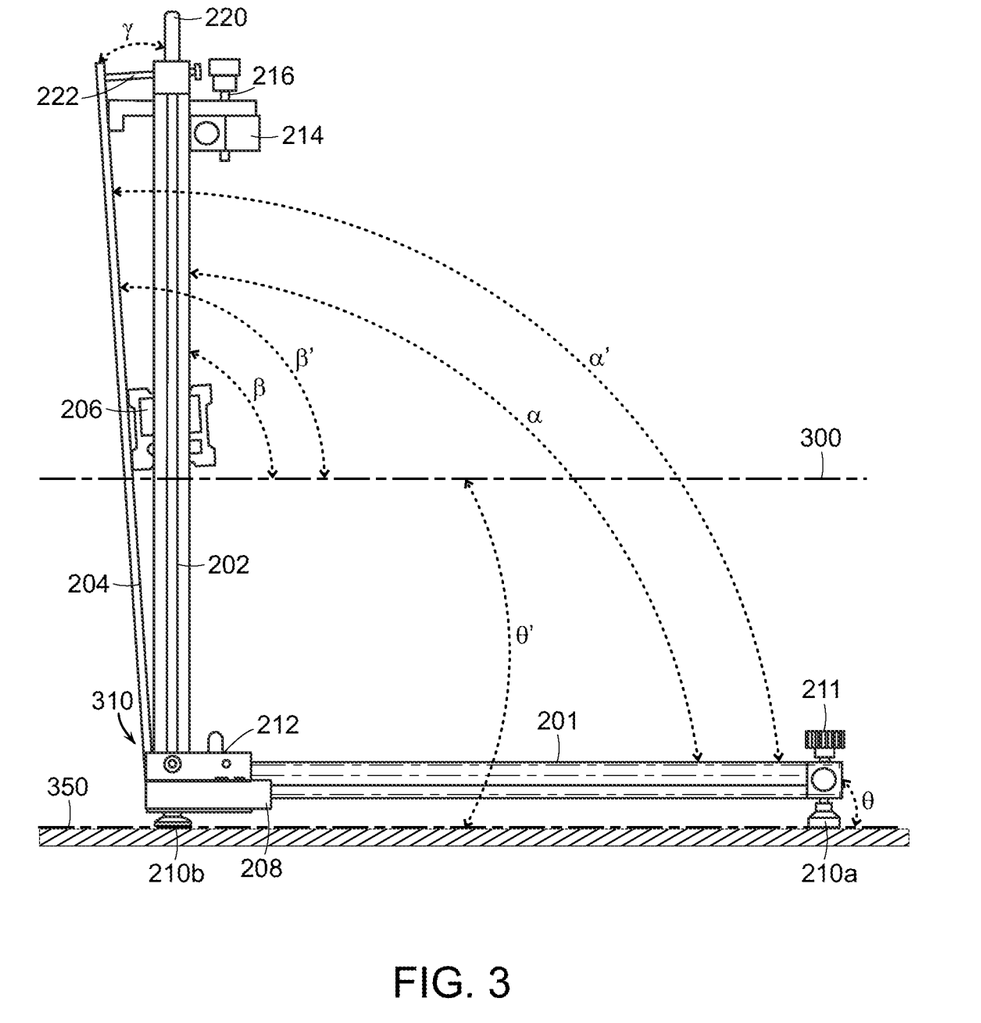
FIG. 3 is a side view of the primary structure of vehicular electromagnetic sensor calibration apparatus.

FIG. 3 shows the primary alignment structure 100 from a side view in an opened position. In particular, FIG. 3 shows additional relations between the components of the primary alignment structure 100 and the surrounding environment, which may be useful during calibration. Horizontal plane 300 represents a true horizontal plan. Angle $\alpha$ represents the angle of the second sub-structure 202 with respect to the first sub-structure 201. Angle $\beta$ represents the verticality of second sub-structure 202, the angle between the second sub-structure 202 and horizontal plane 300. In one embodiment, the reflective-surface plate 204 is disposed at an adjustable angle with respect to the second sub-structure 202. Angle $\gamma$ represents the angle between the reflective-surface plate 204 and second sub-structure 202. Angle α' represents the angle between the reflective-surface plate 204 and first sub-structure 201. Angle β' represents the verticality of reflective-surface plate 204, the angle between the reflective-surface plate 204 and horizontal plane 300. As shown in FIG. 3, α' is equal to the sum of α and γ, and β' is equal to the sum of β and γ.

With further respect to FIG. 3, foot structures 210 rest upon a floor surface 350. At least one of foot structures 210 is height-adjustable. In one embodiment, all of foot structures 210 are height-adjustable. As disclosed herein, height-adjustability is achieved by turning a knob 211 to adjust the foot structure 210 in relation to first sub-structure 201, but one of ordinary skill in the art will recognize other equivalent embodiments. Since the primary alignment structure 100 sits upon the floor surface 350, adjustment of the foot structure 210 in relation to first sub-structure 201 changes the angle of the first sub-structure 201 with respect to the floor surface 350. Though floor surface 350 is substantially horizontal, floor surface 350 may not be perfectly parallel with horizontal plane 300. Angle θ' represents the angle between the floor surface 350 and horizontal plane 300. It is expected that in some embodiments θ' may equal zero degrees when floor surface 350 is parallel to a true horizontal, but in workshops with pitched floors (e.g., to allow for drainage), θ' may vary. It is also envisioned that foot structures 210 may have sufficient size and length to provide for a calibration on a slope while still providing a substantially stable positioning of the primary alignment structure 100 in view of the electromagnetic sensor 150 sufficient for calibration.

Height-adjustable foot structures 210 are advantageous because they permit primary alignment structure 100 to be positioned on an uneven surface while maintaining stability. A further recognized advantage is because the height-adjustable foot structures 210 are individually adjustable, an angle θ between first sub-structure 201 and floor surface 350 may be adjusted by selective adjustment of individual foot structures 210. If α' is maintained during this adjustment, selective adjustment of individual foot structures 210 will yield a further adjustment of the verticality of reflective-surface plate 204. Thus, foot structures 210 provide a mechanism for fine adjustment of β and β' using selective height adjustment thereof. For example, in the depicted embodiment of FIG. 3, lengthening height-adjustable foot structure 210a without adjusting height-adjustable foot structure 210b yields an increase in θ, β and β'.

Connective joint 212 coupling first sub-structure 201 and second sub-structure 202 may provide the pivot point for angle α between the two sub-structures. Connective joint 212 may also provide an option for adjustment of the verticality of reflective-surface plate 204. In another embodiment, the connective joint 212 provides for the primary alignment structure to be folded upon itself (see FIG. 6).

FIG. 3 further shows an embodiment of a pivot-point coupling mechanism 310 and the angle-adjustable coupling mechanism 222. As shown, the pivot-point coupling mechanism 310 couples the reflective-surface plate 204 to the second sub-structure 202 such that the coupling forms a pivot point acting as the vertex of γ. Angle-adjustable coupling mechanism 222 is shown in greater detail in FIG. 4.

Figure 4:
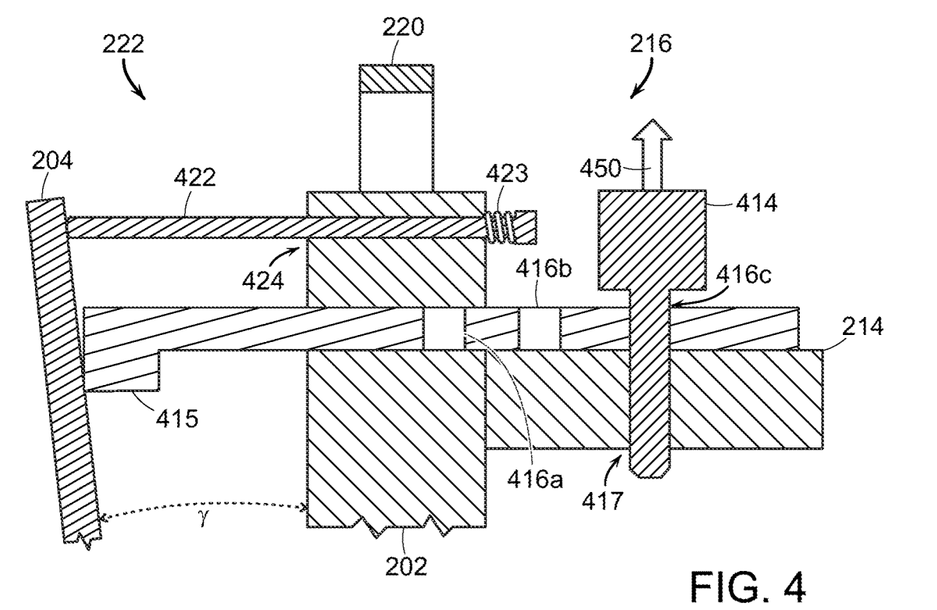
FIG. 4 is a partial cross-sectional diagrammatic view of an adjustable-angle coupling mechanism and quick-adjustment pivot mechanism.

With respect to FIG. 4, an embodiment of angle-adjustable coupling mechanism 222 is shown comprising a spring-loaded screw 422 coupled to reflective-surface plate 204 through a screw-hole 424 in second sub-structure 202. Spring-loaded screw 422 is held in a biased position with respect to the second sub-structure 202 using a spring 423, such that the screw head is pushed by the spring away from the second sub-structure 202. Because screw-hole 424 is not threaded, in this embodiment, the spring-loaded screw 422 is able to move freely therein, while the spring 423 maintains a bias of the reflective-surface plate 204 towards the second sub-structure 202. Use of a spring-loaded screw 422 advantageously provides a "floating" coupling between the reflective-surface plate 204 and second sub-structure 202 such that the reflective-surface plate 204 may be freely displaced up to any portion of the length of spring-loaded screw 422 when subjected to sufficient force to compress the spring. In one embodiment, pivot-point coupling mechanism 310 has the same structure as angle-adjustable coupling mechanism 222, only with a shorter spring-loaded screw such that the reflective-surface plate 204 is substantially fixed to allow pivoting but no displacement from second sub-structure 202.

FIG. 4 further provides details of an embodiment of the quick-adjustment pivot mechanism 216. Quick-adjustment pivot mechanism 216 is comprised of a quick-adjustment pivot mechanism body 415 defining measured insertion points 416a, 416b, and 416c, a pin 414, and the crossbar 214 further defining a crossbar insertion point 417. Quick-adjustment pivot mechanism 216 may be held in a position relative to the crossbar 214 using pin 414 inserted into one of the measured insertion points 416a, 416b, and 416c, and simultaneously into crossbar insertion point 417. Pin 414 is removable in direction 450 from both crossbar 214 and quick-adjustment pivot mechanism body 415, permitting quick-adjustment pivot mechanism body 415 to move freely when removed. Pin 414 can be inserted into the quick-adjustment, pivot mechanism body 415 at measured insertion points 416, preventing free movement of quick-adjustment pivot mechanism 415. Quick-adjustment pivot mechanism body 415 may contact the reflective-surface plate 204, and may be used to move the reflective-surface plate 204 with respect to the second sub-structure 202. When the reflective-surface plate 204 is moved away from the second sub-structure 202, the spring 423 and spring-loaded screw 422 bias the reflective-surface plate 204 against the quick-adjustment pivot mechanism body 415 and each of measured insertion points 416 are spaced such that when pin 414 is used to couple quick-adjustment pivot mechanism 216 to crossbar 214, the end of quick-adjustment pivot mechanism body 415 in contact with reflective-surface plate 204 such that it displaces reflective-surface plate 204 about the pivot point at a known angle γ. In one embodiment, each of measured insertion points 416 are spaced such that the difference in γ is 2 degrees between adjacent points. In a one embodiment, measured insertion point 416a displaces reflective-surface plate 204 such that γ is 0 degrees.

Figure 5:
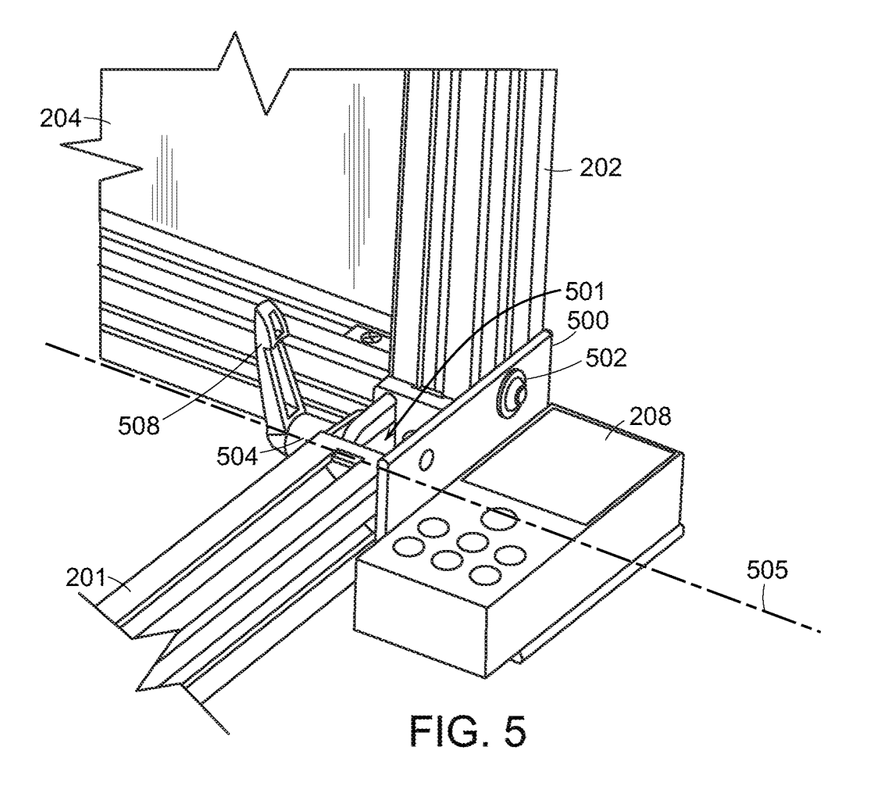
FIG. 5 is a detailed view of a connective joint of the primary structure.

FIG. 5 shows a close up of an embodiment of a connective joint 212 coupling first sub-structure 201 and second sub-structure 202. Joint housing 500 accepts the ends of each sub-structure 201, 202, which are affixed thereto using bolt-washer assemblies 501, 502. Axis bolt 504 further provides a rotational axis 505 about which the second sub-structure 202 will rotate in relation to first sub-structure 201. Lock lever 508 is adjustable to hinder or permit rotation about the rotational axis and maintain a particular angle between the first sub-structure 201 and second sub-structure 202. In one embodiment, lock lever 508 is hand-operated. Lock lever 508 may provide for a fixed relationship preventing rotation, or may provide for a frictional connection allowing for the first sub-structure 201 to rotate relative the second sub-structure 202. In the embodiment of a frictional connection lock lever 508 a force may be exerted on the second sub-structure 202 sufficient enough to overcome the static friction of the lock lever 508 allowing the second sub-structure 202 to move relative the first sub-structure 201 and when the force is removed the lock lever 508 may effectively hold the two sub-structures fixed in relation to each other. The connective joint 212 may allow for the second sub-structure 202 to form any angle with respect to first sub-structure 201 between 0 degrees and 180 degrees.

Figure 6:
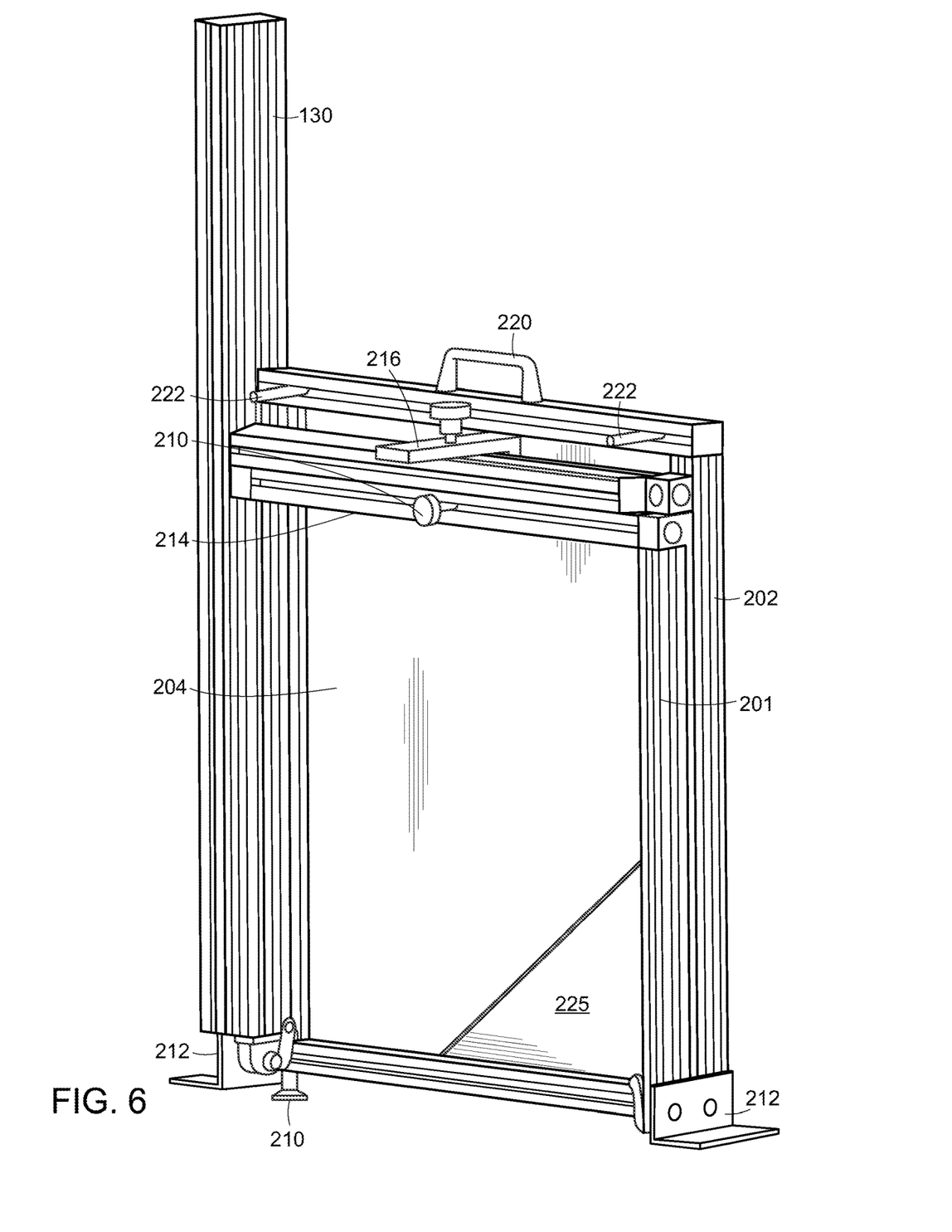
FIG. 6 is an isometric view of the apparatus disclosed herein in a portable form.

As shown in FIG. 6, the range of motion provided by connective joint 212 advantageously permits the primary alignment structure 100 to be put into a compact configuration suitable for transportation or storage. Tracking-alignment reference structure 130 can further be detachably fastened to the primary alignment structure 100 for portability of the entire apparatus. In one embodiment, tracking-alignment reference structure 130 is built to interlock with the frame of the primary alignment structure 100, but other contemplated fastening embodiments include a strap, hook-and-loop tie, screw, clamp, clasp, or other equivalents known to one of ordinary skill in the art. In the shown embodiment, verticality instrument 206 and linear-distance instrument 208 are detachable from primary alignment structure 100 and may be placed within storage enclosure 225 to protect the instruments from damage during storage or transport. In one embodiment, storage enclosure 225 is detachably fastened to primary alignment structure 100 using a hook-and-loop tie, but contemplated alternatives include a strap, screw, clamp, clasp, interlocking structure, or other equivalents known to one of ordinary skill in the art. In one embodiment, storage enclosure 225 is a nylon pouch, but other contemplated alternatives include containers made from canvas, leather, imitation leather, rubber, rigid plastic, wood, metal, or other equivalents known to one of ordinary skill in the art.

With further respect to FIG. 6, tracking-alignment reference structure 130 may be foldable or collapsible to improve its portability when detachably fastened to primary alignment structure 100. In the shown embodiment, folded or collapsed forms of tracking-alignment reference structure 130 can be detachably fastened to primary alignment structure 100 such that no parts of the apparatus are loose from the rest of the apparatus.

Figure 7:
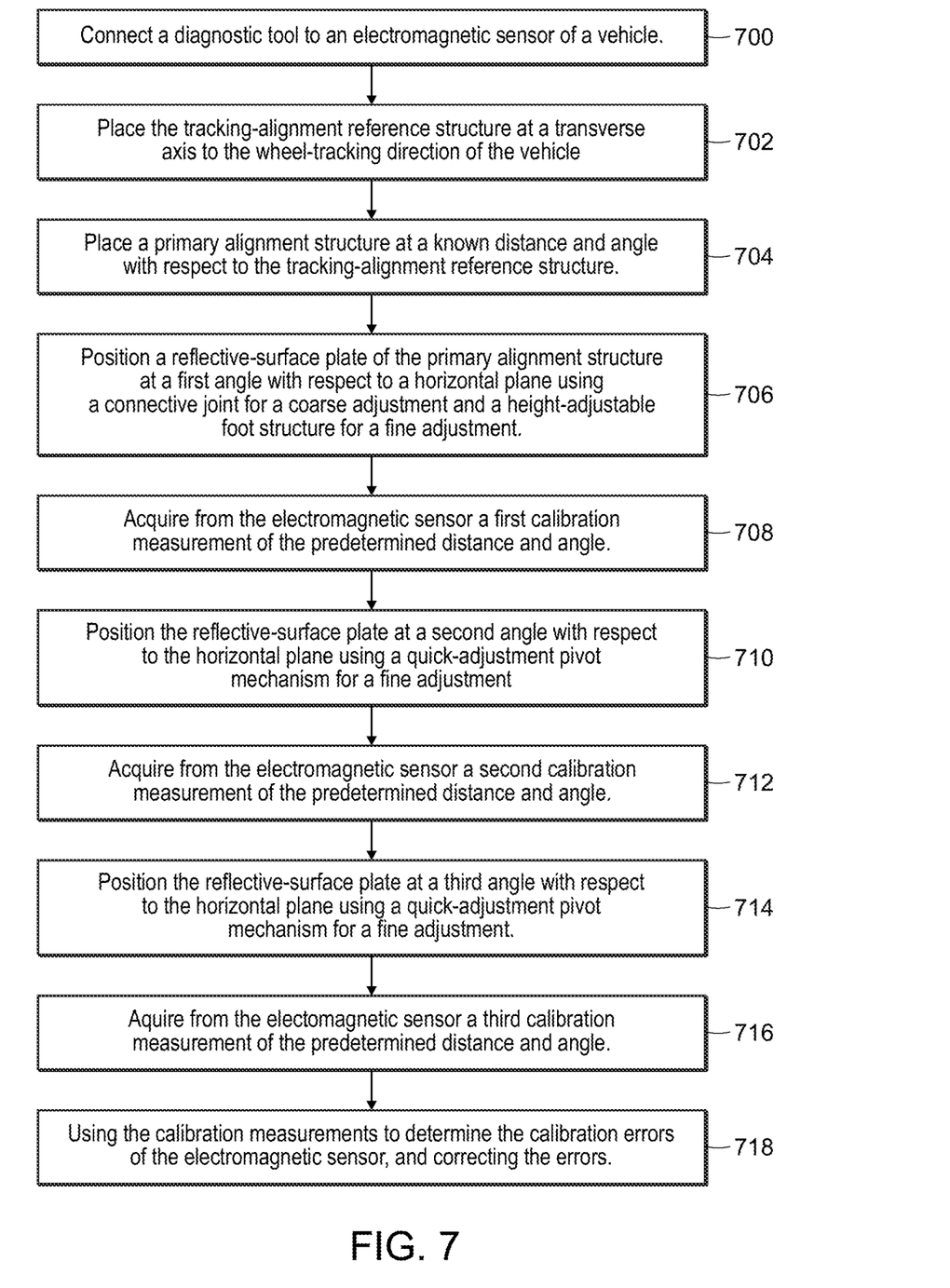
FIG. 7 is a flowchart showing a method of using the apparatus for calibrating a vehicular electromagnetic sensor.

FIG. 7 shows the steps a method of using the system disclosed herein to calibrate an electromagnetic sensor 150 of a vehicle 160. It is noted, but not shown in FIG. 7, that if the apparatus of using the method is optionally in a compact configuration (e.g., as depicted in FIG. 6), the apparatus must be prepared into a configuration suitable for use during calibration. By way of example and not limitation, as disclosed in the embodiment of FIG. 6, preparation includes detaching the tracking-alignment reference structure 130 from primary alignment structure 100, unfolding or assembling tracking-alignment reference structure 130, removing verticality instrument 206 and linear-distance instrument 208 from storage enclosure 225, coupling verticality instrument 206 to reflective-surface plate 204, coupling the linear-distance instrument 208 to primary alignment structure 100, and positioning the primary alignment structure 100 such that the first sub-structure 201 rests substantially horizontally on its foot structures 210. Some or all of these preparation steps may not necessarily be required based upon the configuration of the apparatus prior to calibration, and one of ordinary skill will recognize which steps are necessary to properly configure the apparatus for calibration. It is further noted that FIG. 7 shows the steps of one particular embodiment, and does not provide a limiting disclosure of the contemplated method herein.

At step 700, diagnostic tool 140 is connected to electromagnetic sensor 150. At step 702, the tracking-alignment reference structure 130 is positioned in relation to vehicle 160 at a transverse axis to the wheel-tracking of vehicle 160. At step 704, primary alignment structure 100 is positioned such that the reflective-surface plate 204 is parallel to the tracking-alignment reference structure 130 at a known calibration distance. In the described embodiment, tracking-alignment reference structure 130 is placed in a transverse axis to the wheel-tracking of the rearmost wheels of vehicle 160. One of ordinary skill will recognize that other placements can be used. The known distance between the primary alignment structure 100 and tracking-alignment structure 130 is determined based upon the specification of vehicle 160, more specifically in relation to the location of the electromagnetic sensor 150 within vehicle 160. Proper placement of the primary alignment structure 100 will yield a configuration such that the electromagnetic sensor 150 on the vehicle is a required calibration distance away from the reflective-surface plate 204, and disposed between the reflective-surface plate 204 and the tracking-alignment reference 130. Proper placement of the primary alignment structure 100 will further advantageously provide calibration of electromagnetic sensor 150 with respect to the direction of forward motion of vehicle 160. The particular calibration distance is determined by the specification of the electromagnetic sensor 150. In one embodiment herein, the required calibration distance is 24 inches, but one of ordinary skill will recognize that any distance that is proper for the electromagnetic sensor 150 can be achieved in the manner disclosed herein.

At step 706, the reflective-surface plate 204 is positioned at a first known angle with respect to a true horizontal plane 300. Reflective-surface plate 204 is coarsely positioned in a substantially upright position using connective joint 212 by adjusting the angle between first sub-structure 201 and second sub-structure 202 and held in, position by lock lever 508 of connective joint 212. The particular angle of reflective-surface plate 204 is then finely-adjusted until the desired angle of verticality is indicated on verticality instrument 206. In the described embodiment, fine adjustments to verticality are accomplished by selective adjustment of height-adjustable foot structures 210 until verticality instrument 206 indicates that reflective-surface plate 204 has a verticality of 88 degrees while pin 414 is inserted into measured insertion point 416a.

At step 708, the diagnostic tool acquires a first calibration measurement of the known calibration distance at the first known angle.

At step 710, the reflective-surface plate 204 is re-positioned to a second known angle with respect to true horizontal plane 300. Advantageously, the fine angle-adjustment between the first known angle and the second known angle may be achieved using quick-adjustment pivot mechanism 216. Quick-adjustment pivot mechanism 216 includes quick-adjustment pivot mechanism body 415 having measured insert points 416. Each of measured insertion points 416 is spaced such that when pin 414 is used to couple quick-adjustment mechanism body 415 to crossbar 214, a different angle γ is produced between reflective-surface plate 204 and second sub-structure 202. Each of measured insertion points 416 corresponds to a different displacement resulting in a value of γ that is needed during the calibration process. The second known angle may therefore be achieved by directly displacing reflective-surface plate 204 into the desired second known angle from the first known angle. In this disclosed embodiment, pin 414 is moved from measured insertion point 416a to measured insertion point 416b, resulting in verticality for reflective-surface plate 204 of 90 degrees.

At step 712, the diagnostic tool acquires a second calibration measurement of the known calibration distance at the second known angle.

At step 714, the reflective-surface plate 204 is re-positioned to a third known angle with respect to true horizontal plane 300. Advantageously, adjustment to the third known angle may be achieved using the quick-adjustment pivot mechanism 216 as detailed with respect to step 710. In this disclosed embodiment, pin 414 is moved from measured insertion point 416b to measured insertion point 416c, resulting in verticality for reflective-surface plate 204 of 92 degrees.

At step 716, the diagnostic tool acquires a third calibration measurement of the known calibration distance at the third known angle.

At step 718, the diagnostic tool uses the calibration measurements to determine the calibration errors of electromagnetic sensor 150. Using the determined calibration errors, the diagnostic tool makes corrections to the operation of electromagnetic sensor 150 to compensate for the errors.

In one embodiment, at least one of the three known angles of verticality is perpendicular (90 degrees) from the horizontal plane. In the same embodiment, the other known angles are ±2 degrees from perpendicular (i.e., 88 degrees and 92 degrees). The exact angles of reflective-surface plate 204 may vary based on the specification of electromagnetic sensor 150. One of ordinary skill in the art will recognize that because connective joint 212 permits any angle between first sub-structure 201 and second sub-structure 202 between 0 and 180 degrees any known angle of reflective-surface plate 204 specified for electromagnetic sensor 150 may be achieved.

One of ordinary skill in the art will recognize that the angle-adjustment limits of quick-adjustment pivot mechanism 216 are dependent upon the total length of spring-loaded screw 422. In one embodiment, spring-loaded screw 422 is sufficiently long to permit total angle-adjustments of up to 8 degrees.

One of ordinary skill in the art will recognize that the angle-adjustment limits of height-adjustable foot structures 210 are dependent upon their complete range of height adjustment values. In one embodiment, height-adjustable foot structures 210 provide sufficient height adjustments to permit total angle-adjustments of up to 8 degrees.

The method of FIG. 7 is disclosed for purpose of description and not limitation. The calibration may require the three known angles of verticality in any order. The order of the measurements does not affect the outcome of the calibration, but each calibration measurement requires a particular known angle of reflective-surface plate 204 to achieve proper calibration of electromagnetic sensor 150. Any ordering of specific calibration angles (e.g., 88 degrees, 90 degrees, 92 degrees) can be considered the sequence of a first, second, and third known angle required for diagnostic tool 140 to properly calibrate electromagnetic sensor 150. The method disclosed herein can be performed with each of the three known angles used in calibration corresponding to any of steps 706, 710, and 714. Furthermore, the angle-adjustments of steps 706, 710 and 714 may be performed using any combination of the three adjustment techniques described herein and still be considered within the scope of the disclosure herein.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. An electromagnetic sensor calibration apparatus operable to calibrate an electromagnetic sensor of a vehicle in conjunction with a diagnostic tool configured to place the vehicle's electromagnetic sensor system into a calibration mode, the apparatus comprising:
   a tracking-alignment reference structure configured to provide a transverse axis to a wheel-tracking of the vehicle;
   a primary alignment structure having a first sub-structure configured to be substantially horizontal during calibration, a second sub-structure coupled to the first sub-structure and configured to be substantially upright during calibration, a reflective-surface plate coupled to the second sub-structure and operable to reflect electromagnetic waves emitted from the electromagnetic sensor, and a verticality instrument configured to measure the alignment of the reflective-surface plate with respect to a horizontal plane; and
   a linear-distance instrument operable to align the reflective-surface plate to be substantially parallel to the transverse axis,
   wherein the reflective-surface plate is coupled to the second sub-structure such that the reflective-surface olate may be adjusted to an angle with respect to the second sub-structure, and
   wherein the reflective-surface plate is coupled to the second sub-structure in part by a number of spring-loaded screws and in part by a pivoting connective structure, wherein the pivoting connective structure forms a pivot point between the reflective-surface plate and the second sub-structure, and wherein the second sub-structure further comprises a crossbar offset from both the spring-loaded screws and the pivoting connective structure, the crossbar further coupled to a quick-adjustment pivot mechanism in contact with the reflective-surface plate, the quick-adjustment pivot mechanism operable to tilt the reflective-surface plate about the pivot point between the reflective-surface plate and the second sub-structure.

2. The apparatus of claim 1, wherein the first sub-structure further comprises three foot structures, wherein at least one of the foot structures is height-adjustable.

3. The apparatus of claim 2, wherein the at least one adjustable foot structure is height-adjustable such that the vertical angle of the reflective-surface plate is finely adjusted during calibration.

4. The apparatus of claim 1, wherein the second sub-structure is coupled to the first sub-structure using a connective joint, the connective joint operable to permit angle adjustments between the first sub-structure and the second sub-structure such that the reflective-surface plate is finely adjusted with respect to its angle formed with the first sub-structure.

5. The apparatus of claim 4, wherein the connective joint further permits the reflective-surface plate to assume any angle within the range of 0 degrees to 180 degrees with respect to the first sub-structure.

6. The apparatus of claim 1, wherein the reflective-surface plate has a flatness of at least 0.12 mm.

7. The apparatus of claim 1, wherein the reflective-surface plate is made from one of glass, mirrored glass, or aluminum.

8. The apparatus of claim 1, wherein a first angle a between the first sub-structure and second structure is substantially 88 degrees, and the quick adjustment pivot mechanism is operable to provide a second additional angle y between the second sub-structure and the reflective-surface plate, in two-degree increments, between zero and four degrees.

9. The apparatus of claim 1, wherein,
the first sub-structure comprises a plurality of adjustable foot structures operably coupled thereto, at least one of the plurality of foot structures being height-adjustable such that the vertical angle of the reflective-surface plate is finely adjusted during calibration;
wherein the second sub-structure is coupled to the first sub-structure using a connective joint, the connective joint operable to permit angle adjustments between the first sub-structure and the second sub-structure such that the reflective-surface plate is finely adjusted with respect to its angle formed with the first sub-structure.

10. The apparatus of claim 1, wherein the tracking-alignment reference structure is removeably attached to the primary alignment structure when not in use during calibration.

11. The apparatus of claim 1, wherein the linear-distance instrument may be removeably attached to the primary alignment structure, and wherein the primary structure further comprises a storage enclosure, the storage enclosure having internal dimensions large enough such that the linear-distance instrument may be disposed entirely within the storage enclosure.

12. The apparatus of claim 1, wherein the linear-distance instrument comprises one of an optical rangefinder or a sonic rangefinder.

13. The apparatus of claim 1, wherein the reflective-surface plate is substantially aligned with the second sub-structure, the second sub-structure is substantially aligned with the first sub-structure, the tracking-alignment reference structure is removeably attached to the primary alignment structure, and the primary alignment structure further comprises a handle operable to support the apparatus when transported.

14. An electromagnetic sensor calibration system operable to calibrate an electromagnetic sensor of a vehicle, the system comprising:
a diagnostic tool configured to communicate with the vehicle's electromagnetic sensor system to calibrate the electromagnetic sensor;
a tracking-alignment reference structure configured to provide a transverse axis to a wheel-tracking of the vehicle by contacting rear wheels on the vehicle;
a primary alignment structure having a first sub-structure configured to be substantially horizontal during calibration, a second sub-structure coupled to the first sub-structure and configured to be substantially upright during calibration, a reflective-surface plate coupled to the second sub-structure and operable to reflect electromagnetic waves emitted from the electromagnetic sensor, and a verticality instrument coupled to the reflective-surface plate, the verticality instrument configured to measure the alignment of the reflective-surface plate with respect to a horizontal plane and aid placement of the reflective-surface plate in a substantially perpendicular alignment with the horizontal plane; and
a linear-distance instrument operable to align the reflective-surface plate to be substantially parallel to the transverse axis,
wherein the reflective-surface late is coupled to the second sub-structure such that the reflective-surface plate may be adjusted to an angle with respect to the second sub-structure, and wherein the reflective-surface plate is coupled to the second sub-structure in art by a number of spring-loaded screws and in part by a pivoting connective structure, wherein the pivoting connective structure forms a pivot point between the reflective-surface plate and the second sub-structure, and wherein the second sub-structure further comprises a crossbar offset from both the spring-loaded screws and the pivoting connective structure, the crossbar further coupled to a quick-adjustment pivot mechanism in contact with the reflective-surface plate, the quick-adjustment pivot mechanism operable to tilt the reflective-surface olate about the pivot point between the reflective-surface plate and the second sub-structure.

15. A method for utilizing a portable electromagnetic sensor calibration system comprising a foldable primary alignment structure to calibrate an electromagnetic sensor of a vehicle having a plurality of wheels, the method comprising:
unfolding a first sub-structure from a second sub-structure of the primary alignment structure, the primary alignment structure having a reflective-surface plate operable to reflect electromagnetic waves emitted by the electromagnetic sensor;
placing the reflective-surface plate at a known distance from the electromagnetic sensor and at an angle perpendicular to a wheel-tracking direction of the vehicle:
adjusting a tilt of the reflective-surface plate such that the reflective-surface plate is perpendicular to a horizontal plane;
acquiring from the electromagnetic sensor a first calibration measurement of the known distance and tilt of the reflective-surface plate relative to the electromagnetic sensor;
adjusting the tilt of the reflective-surface plate to a predetermined obtuse angle to the horizontal plane;
acquiring from the electromagnetic sensor a second calibration measurement of the known distance and tilt of the reflective-surface plate relative to the electromagnetic sensor;
adjusting the tilt of the reflective-surface plate such that the reflective-surface plate is at a predetermined acute angle to the horizontal plane;
acquiring from the electromagnetic sensor a third calibration measurement of the known distance and tilt of the reflective-surface plate relative to the electromagnetic sensor; and
using the calibration measurements of the electromagnetic sensor to determine calibration errors of the electromagnetic sensor,
wherein the tilt of the reflective-surface plate is adjusted using a) a height-adjustable foot structure on to the primary alignment structure to adjust the tilt of the entire primary alignment structure including the reflective-surface plate, b) a connective joint disposed between the reflective-surface plate and a first sub-structure of the primary alignment structure to tilt the reflective-surface plate relative the first sub-structure, and c) a quick-adjustment pivot mechanism disposed between a the reflective-surface plate and the second sub-structure of the primary alignment structure to tilt the reflective-surface plate relative to the second sub-structure, the quick-adjustment pivot mechanism having a plurality of measured insertion points and utilizing a removeable pin configured to be inserted into one of the measured insertion points, each of the plurality of insertion points corresponding to a particular tilt measurement of the reflective-surface plate.

16. The method of claim 15, wherein the predetermined obtuse angle and the predetermined acute angle are each offset 2 degrees from perpendicular with respect to the horizontal plane, the predetermined obtuse angle and the predetermined acute angle each being achieved using a quick-adjustment pivot mechanism operable to tilt the reflective-surface plate relative to the second sub-structure in 2 degree increments.

17. The method of claim 15, wherein the position and angle of the primary alignment structure at the predetermined distance from the electromagnetic sensor is determined by placing a tracking-alignment reference structure at a transverse axis to the wheel-tracking of the vehicle and placing the primary alignment structure at a second known distance from and parallel to the tracking-alignment reference structure, wherein the electromagnetic sensor is disposed between the primary alignment structure and the tracking-alignment reference structure.

\* \* \* \* \*

UNITED STATES PATENT AND TRADEMARK OFFICE
CERTIFICATE OF CORRECTION

PATENT NO. : 11,009,587 B2  
APPLICATION NO. : 15/982640  
DATED : May 18, 2021  
INVENTOR(S) : Conrad et al.

Page 1 of 1

It is certified that error appears in the above-identified patent and that said Letters Patent is hereby corrected as shown below:

In the Claims

Column 10, Line 34 should read: -- plate may be adjusted to an angle with respect to the --

Column 11, Line 8 should read: -- stantially 88 degrees, and the quick-adjustment pivot mecha- --

Column 12, Line 7 should read: -- wherein the reflective-surface plate is coupled to the sec- --

Column 12, Line 11 should read: -- is coupled to the second sub-structure in part by a --

Column 12, Line 22 should read: -- tive-surface plate about the pivot point between the --

Signed and Sealed this  
Twentieth Day of July, 2021

Drew Hirshfeld  
*Performing the Functions and Duties of the*  
*Under Secretary of Commerce for Intellectual Property and*  
*Director of the United States Patent and Trademark Office*